United States Patent
Yan et al.

(10) Patent No.: US 9,876,517 B2
(45) Date of Patent: Jan. 23, 2018

(54) RF RECEIVER AND DIGITALLY-ASSISTED CALIBRATION METHOD APPLICABLE THERETO

(71) Applicant: MEDIATEK Inc., Hsin-Chu (TW)

(72) Inventors: Sheng-Hong Yan, Tainan (TW); Sheng-Hao Chen, Hsinchu (TW); Paul Cheng Po Liang, Zhubei (TW); Jen-Che Tsai, Taichung (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 14/754,860

(22) Filed: Jun. 30, 2015

(65) Prior Publication Data

US 2015/0303957 A1 Oct. 22, 2015

Related U.S. Application Data

(63) Continuation of application No. 13/798,241, filed on Mar. 13, 2013, now Pat. No. 9,100,078.

(60) Provisional application No. 61/622,317, filed on Apr. 10, 2012.

(51) Int. Cl.
*H04B 1/10* (2006.01)
*H04B 17/11* (2015.01)
*H04B 1/12* (2006.01)

(52) U.S. Cl.
CPC .............. *H04B 1/1081* (2013.01); *H04B 1/10* (2013.01); *H04B 1/123* (2013.01); *H04B 17/11* (2015.01)

(58) Field of Classification Search
CPC ................................ H04B 1/1027; H04B 1/123
See application file for complete search history.

(56) References Cited

U.S. PATENT DOCUMENTS

| | | | |
|---|---|---|---|
| 6,262,603 B1 | 7/2001 | Mohan et al. | |
| 6,704,551 B2 | 3/2004 | Riou et al. | |
| 7,911,181 B2 | 3/2011 | Raidl et al. | |
| 2006/0291549 A1* | 12/2006 | Seppinen | H04B 17/21 375/227 |
| 2007/0109063 A1* | 5/2007 | Lau | H03H 7/0153 331/111 |
| 2009/0131006 A1 | 5/2009 | Wu | |
| 2009/0140701 A1* | 6/2009 | Raidl | H03H 7/0153 320/166 |
| 2010/0253558 A1* | 10/2010 | Chen | H04B 1/0035 341/120 |

(Continued)

FOREIGN PATENT DOCUMENTS

| | | |
|---|---|---|
| CN | 1457555 A | 11/2003 |
| CN | 101442392 A | 5/2009 |

OTHER PUBLICATIONS

SIPO Office Action dated Dec. 21, 2015 in corresponding Chinese application (No. 201310115702.X).

(Continued)

*Primary Examiner* — Shuwang Liu
*Assistant Examiner* — Gina McKie
(74) *Attorney, Agent, or Firm* — McClure, Qualey & Rodack, LLP (57) ABSTRACT

A radio frequency (RF) receiver includes a digital tuning engine; and I-path and Q-path analog filters, tuned by the digital tuning engine. The digital tuning engine gets an I/Q imbalance difference, and the digital tuning engines tunes the I-path analog filter and/or the Q-path analog filter based on the I/O imbalance difference.

20 Claims, 3 Drawing Sheets

(56) References Cited

U.S. PATENT DOCUMENTS

| | | | | |
|---|---|---|---|---|
| 2012/0033766 A1* | 2/2012 | Hosokawa | ............ | H04B 1/0032 375/340 |
| 2013/0148703 A1* | 6/2013 | Kim | ..................... | H04B 1/0057 375/219 |
| 2015/0022386 A1* | 1/2015 | Lam | ........................ | H03M 3/38 341/120 |

OTHER PUBLICATIONS

Don O'Riordan: "Recommended Spectre Monte Carlo Modeling Methodology"; Cadence Design Systems; Version 1, Dec. 17, 2003; Copyright © 2006, Don O'Riordan; pp. 1-12.

Zhou, et al.: "Impact of LPF Mismatch on I/Q Imbalance in Direct Conversion Receivers"; IEEE Transactions on Wireless Communications, vol. 10, No. 6, Jun. 2011; pp. 1702-1708.

Yuhua Cheng: "The Influence and Modeling of Process Variation and Device Mismatch for Analog/RF Circuit Design (Invited)"; Fourth IEEE International Caracas Conference on Devices, Circuits and Systems, Aruba, Apr. 17-19, 2002.

\* cited by examiner

RF RECEIVER AND DIGITALLY-ASSISTED CALIBRATION METHOD APPLICABLE THERETO

This application is a continuation application of U.S. application Ser. No. 13/798,241 filed Mar. 13, 2013, which claims the benefit of U.S. provisional application Ser. No. 61/622,317, filed Apr. 10, 2012, now U.S. Pat. No. 9,100,078, the subject matters of which are incorporated herein by reference.

TECHNICAL FIELD

The disclosure relates in general to a radio frequency (RF) receiver and a digitally-assisted calibration method applicable thereto.

BACKGROUND

Radio frequency (RF) system is widely adopted in wireless communication. RF system includes at least one RF receiver and at least one RF transmitter. RF receivers are typically designed to operate in a given bandwidth resource. Analog and digital baseband (ADBB) receivers usually operate on signals occupying a subset of the RF receiver operating bandwidth. Such a subset is called a channel.

RF transmitter may interfere with operations of the RF receiver even though the RF transmitter's frequency spectrum does not overlap the RF receiver's channel frequency spectrum. Out-of-channel interferences, especially nearby interference, may cause severe damage to ADBB receivers (e.g. desensitization, cross-modulation, inter-modulation, saturation, synchronization error, and channel equalization error).

A lot of implementations have been proposed to suppress nearby interferences and/or out-of-channel interferences striking a RF receiver. Analog baseband channel selection filter is a common way to remove nearby (out-of-channel) interferences.

Interference attenuation is determined by the type, order, and cut-off frequency of a filter. If the cut-off frequency of the filter is shifted toward in-band due to filter variations (which may be caused by process variability), in-band signal is hurt. On the contrary, if the cut-off frequency of the filter is shifted toward out-band due to filter variations, interference attenuation decreases.

Mismatch between I-path and Q-path analog filters (I referring to "in-phase" and Q referring to "quadrature-phase") causes frequency-dependent I/Q imbalance, which induces undesired images for quadrature RF receivers.

Analog filters should thus preserve the cut-off frequency and good match between I and Q path analog filters even under process variability.

As for now, there are three kinds of variations for RC-based filter, process variation, random mismatch variation and systematic mismatch variation (gradient effects).

As for process variations, what are considered are the variations of the process, not only of all chips on the same single wafer, but also the variations on different wafers, and even on different lots. Same process variation is assumed for components, such as resistors, capacitors, or transistors, in a chip. Process variation significantly causes cut-off frequency shift from the ideal one and thus injures in-band signal or reduces attenuation of interferences. However, the process variation does not induce frequency-dependent I/Q imbalance since this process variation is the same in the whole chip. RC calibration is used to compensate the process variation.

As for random mismatch variation, what is considered is the random portion of the total mismatch of components, which are located close to each other and which should be matched as closely as possible. Random mismatch variation is stochastic and hence cannot be predicted. Random mismatch variation slightly causes cut-off frequency shift from the ideal one and introduces frequency-dependent I/Q imbalance since random mismatch variation is different for I/Q filters. Random mismatch variation can be limited to a reasonable range by properly enlarging component area, a trade off between performance and area cost.

As for systematic mismatch variation, what is considered is the portion of the total mismatch of components, which are located close to each other and which should be matched as closely as possible, where a deterministic trend can be observed in the mismatch values of the various components. Systematic mismatch variation may be precisely predicted if given the process gradient. Systematic mismatch variation mildly causes cut-off frequency shift from the ideal one. Systematic mismatch variation introduces frequency-dependent I/Q imbalance since systematic mismatch variation is different for I/Q filters.

Thus, it needs a compensation method which compensates mismatch partially in the analog domain and partially in the digital domain for cost-effective designs.

SUMMARY

According to one embodiment, provided is a radio frequency (RF) receiver. The RF receiver includes a digital tuning engine; and I-path and Q-path analog filters, tuned by the digital tuning engine. The digital tuning engine gets an I/Q imbalance difference, and the digital tuning engines tunes the I-path analog filter and/or the Q-path analog filter based on the I/O imbalance difference.

According to another embodiment, provided is a digitally-assisted calibration method applicable to a radio frequency (RF) receiver including an I (in-phase)-path analog filter, a Q (quadrature-phase)-path analog filter and a digital tuning engine. An I/Q imbalance difference is obtained. The I-path analog filter and/or the Q-path analog filter are tuned based on the I/O imbalance difference.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DETAILED DESCRIPTION

Although process variation doesn't induce frequency-dependent I/Q imbalance, random mismatch variation and systematic mismatch variation do introduce frequency-dependent I/Q imbalance. Random mismatch variation may be limited to a reasonable range by enlarging component area properly. So, the embodiment reduces systematic mismatch variation (gradient effect) in the RF/analog circuit design phase and further uses digitally-assisted calibration to reduce impact on I/Q imbalance caused by systematic mismatch variation.

Besides, as for relationship between I/Q filter mismatch and I/Q imbalance, gain imbalances and phase imbalances near DC frequency may be small even under severe filter mismatch. Gain imbalances or phase imbalances near cut-off frequency or a certain frequency become abruptly significant; and in the embodiment of the disclosure, this may be an indicator to detect I/Q filter mismatch.

Figure 1:
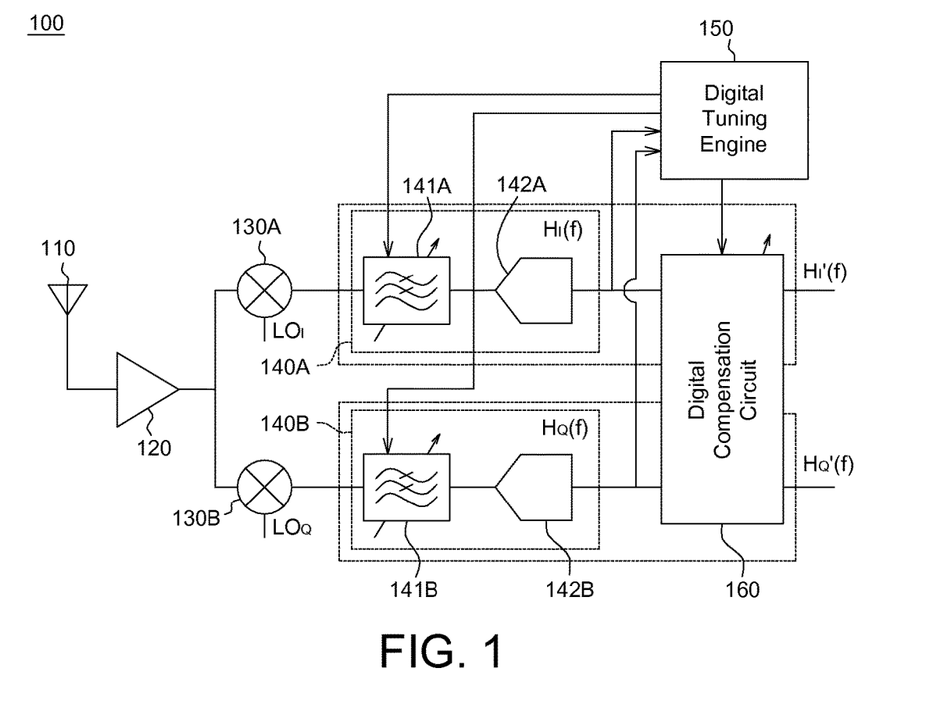
FIG. 1 which shows a RF receiver according to one embodiment of the disclosure.

Referring to FIG. 1 which shows a RF receiver according to one embodiment of the disclosure. As shown in FIG. 1, the RF receiver 100 includes an antenna 110, an amplifier 120, an I-path mixer 130A, a Q-path mixer 130B, an I-path analog filter 140A, a Q-path analog filter 140B, a digital tuning engine 150 and a digital compensation circuit 160.

The antenna 110 receives RF signals from, for example, RF transmitters (not shown) and sends the received RF signals to the amplifier 120.

The I-path mixer 130A mixes the amplified RF signals from the amplifier 120 with a local reference signal $LO_I$. The mixture signals from the I-path mixer 130A are sent to the I-path analog filter 140A. Similarly, the Q-path mixer 130B mixes the amplified RF signals from the amplifier 120 with a local reference signal $LO_Q$. The mixture signals from the Q-path mixer 130B are sent to the Q-path analog filter 140B.

The I-path analog filter 140A includes an analog filter 141A and an analog-digital converter (ADC) 142A. Similarly, the Q-path analog filter 140B includes an analog filter 141B and an analog-digital converter (ADC) 142B. The I-path analog filter 140A and the Q-path analog filter 140B are coupled to and tuned by the digital tuning engine 150.

The digital tuning engine 150 executes a RC (resistor-capacitor) time constant calibration to adjust respective cut-off frequencies of the I-path analog filter 140A and the Q-path analog filter 140B. Further, the digital tuning engine 150 executes a filter mismatch calibration to match the I-path analog filter 140A and the Q-path analog filter 140B. The digital tuning engine 150 executes a filter residual mismatch calibration to match an I-path response from the I-path analog filter 140A to the digital compensation circuit 160 and a Q-path response from the Q-path analog filter 140B to the digital compensation circuit 160. Details of the operations of the digital tuning engine 150 are described in the following.

When the digital tuning engine 150 performs the filter residual mismatch calibration as mentioned above, the digital tuning engine 150 may further concurrently perform a mismatch calibration on the I/Q imbalance happened before the analog filters 140A and 140B, for example, calibrating the I/Q imbalance of the I-path mixer 130A and/or the Q-path mixer 130B. In fact, signals used in the filter residual mismatch calibration pass through the I-path mixer 130A and the Q-path mixer 130B before they arrive at the analog filters 140A and 140B. If I/Q imbalance of the I-path mixer 130A and the Q-path mixer 130B has not fully compensated yet, then in the embodiment, during filter residual mismatch calibration, I/Q imbalance of the I-path mixer 130A and the Q-path mixer 130B may be also removed by the digital tuning engine 150, as long as the I-path analog filter 140A and the Q-path analog filter 140B have enough capability of I/Q mismatch compensation.

The digital compensation circuit 160 is coupled to the digital tuning engine 150, the I-path analog filter 140A and the Q-path analog filter 140B.

Figure 2:
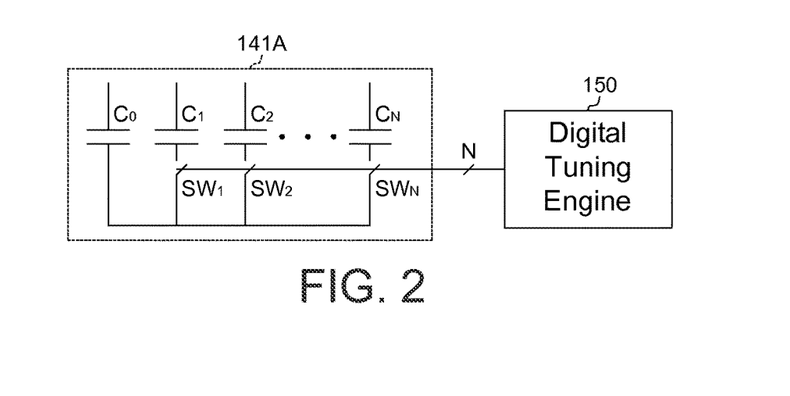
FIG. 2 shows a capacitor bank according to the embodiment of the application.

The analog filter 141A of the I-path analog filter 140A includes a plurality of capacitors each including a capacitor bank. The capacitor bank is tuned by the digital tuning engine. Now, please refer to FIG. 2, which shows a capacitor bank according to the embodiment of the application. As shown in FIG. 2, the capacitor bank includes a plurality of parallel sub-capacitors $C_0 \sim C_N$ and a plurality of parallel switches $SW_1 \sim SW_N$. The switches $SW_1 \sim SW_N$ is coupled to a corresponding one of the sub-capacitors $C_0 \sim C_N$. The digital tuning engine 150 controls setting of the capacitor bank by turning on/off of the switches $SW_1 \sim SW_N$ of the capacitor bank. That is, the digital tuning engine 150 varies the total effective capacitance of the capacitor bank by turning on/off switches $SW_1 \sim SW_N$. Connection/disconnection of switches will have an influence on the total effective capacitance value of the capacitor bank. So, the total effective capacitance of the capacitor bank has a minimum value of $C_0$ and a maximum value of $$C_0 + \sum_{i=1 \sim N} C_i.$$

The structure of the capacitor banks of each capacitor in the Q-path analog filter 140B is the same or similar to that of the I-path analog filter 140A, and thus details are omitted here.

Figure 3:
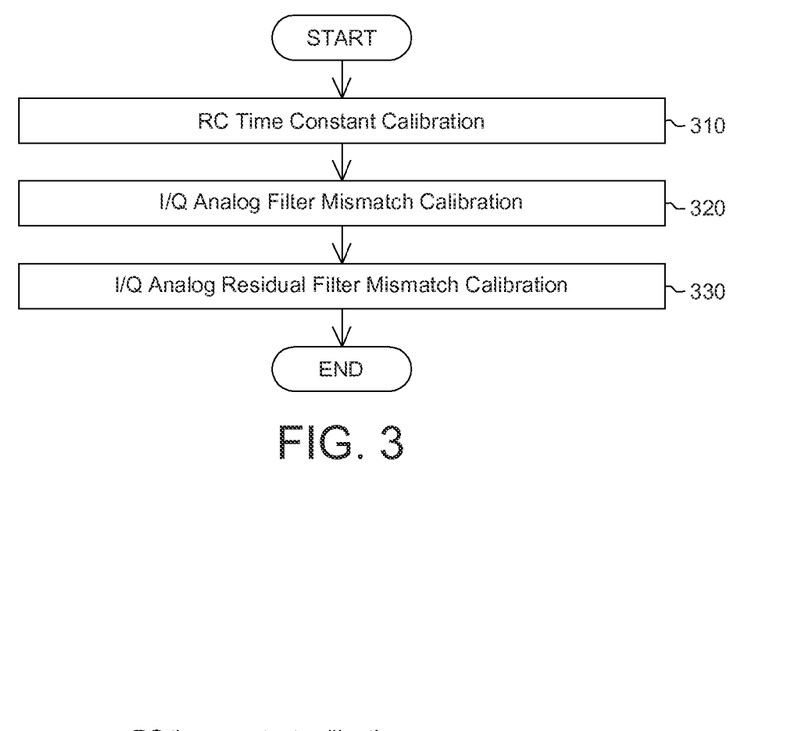
FIG. 3 shows a calibration flow disclosed in the embodiment of the application.

Now, please refer to FIG. 3 for explaining the calibration flow disclosed in the embodiment of the application. In the embodiment of the application, three kinds of calibration are performed, i.e. RC (resistor-capacitor) time constant calibration (for adjusting respective cut-off frequencies of the I-path analog filter 140A and the Q-path analog filter 140B), I/Q filter mismatch calibration (for matching the I-path analog filter 140A and the Q-path analog filter 140B) and I/Q filter residual mismatch calibration (for matching I-path response and Q-path response).

In executing RC time constant calibration in step 310, the digital tuning engine 150 adjusts the filter cut-off frequencies of the I-path analog filter 140A and the Q-path analog filter 140B by turning ON/OFF the capacitors.

Operation principle of RC time constant calibration is for example but not limited by as follows. The capacitance of the capacitor bank is reset (for example, all switches are disconnected so that the total capacitance of the capacitor bank has a minimum value $C_0$). The capacitor bank is charged for a fixed time. An integrator output (for example, from the ADC) is compared with a threshold voltage. The capacitor bank is adjusted (that is, the switches $SW_1 \sim SW_N$ are turned ON/OFF) successively to change the capacitance value of the capacitor bank to make the integrator output equal to the threshold voltage.

In the embodiments, the digital tuning engine has several ways to control the capacitance of the capacitor bank.

One implementation for controlling the capacitance of the capacitor bank is as follows. In executing the RC time constant calibration, the digital tuning engine 150 gets a capacitor bank setting by performing RC time constant calibration on one of the capacitors of either the I-path analog filter 140A or the Q-path analog filter 140B. Then, the digital tuning engine 150 tunes/controls all of the capacitors of both the I-path analog filter 140A and the Q-path analog filter 140B based on the capacitor bank setting. For example, all capacitor banks of both the I-path analog filter 140A and the Q-path analog filter 140B are set based on the capacitor bank setting.

Another implementation for controlling the capacitance of the capacitor bank is as follows. In executing the RC time constant calibration, the digital tuning engine 150 gets an I-path capacitor bank setting by performing RC time constant calibration on one of the capacitors of the I-path analog filter 140A; and the digital tuning engine 150 tunes/controls all of the capacitors of the I-path analog filter based on the I-path capacitor bank setting. For example, all capacitor banks of the I-path analog filter 140A are set based on the I-path capacitor bank setting.

Still another implementation for controlling the capacitance of the capacitor bank is as follows. In executing the RC time constant calibration, the digital tuning engine 150 gets a Q-path capacitor bank setting by performing RC time constant calibration on one of the capacitors of the Q-path analog filter 140B; and the digital tuning engine 150 tunes/controls all of the capacitors of the Q-path analog filter 140B based on the Q-path capacitor bank setting. For example, all capacitor banks of the Q-path analog filter 140B are set based on the Q-path capacitor bank setting.

Figure 4A:
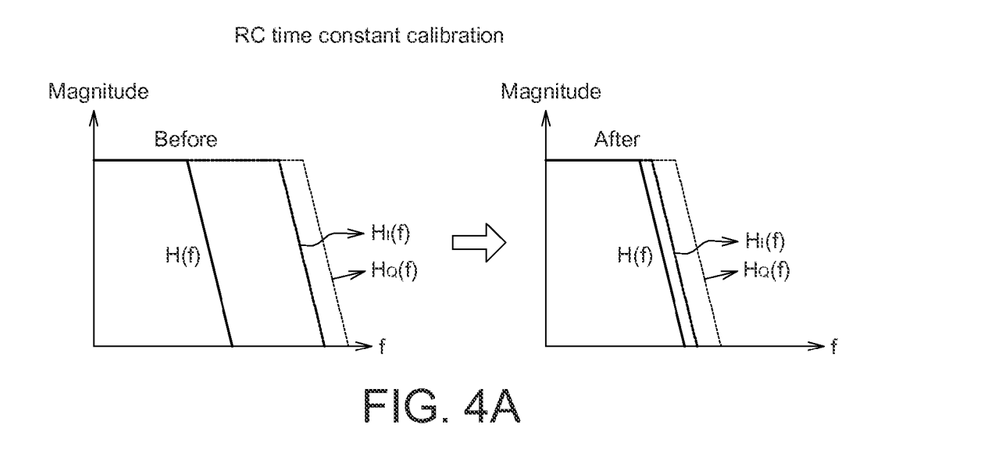
FIG. 4A shows a result of RC time constant calibration in the embodiment of the application.

FIG. 4A shows a result of RC time constant calibration in the embodiment of the application. As shown in FIG. 4A, $H(f)$, $H_I(f)$ and $H_Q(f)$ refers to a target response, an I-path response and a Q-path response. After RC time constant calibration, the I-path response $H_I(f)$ and the Q-path response $H_Q(f)$ are pushed or pulled closer to the target response $H(f)$ than before RC time constant calibration. But, mismatch between the I-path response $H_I(f)$ and the Q-path response $H_Q(f)$ are not calibrated by the RC time constant calibration.

In step 320, I/Q filter mismatch calibration is performed. In executing the filter mismatch calibration, the digital tuning engine 150 gets I/Q gain and phase imbalances at two distinct frequencies to mach the I-path analog filter 140A and the Q-path analog filter 140B. Further, the digital tuning engine 150 has several implementations to execute I/Q filter mismatch calibration.

In one implementation to execute I/Q filter mismatch calibration, a RF transmitter (not shown) transmits a first tone at an in-band frequency to the mixers 130A and 130B to get the gain and phase imbalance at in-band frequency, which includes mixer and filter mismatches. In details, in response to the first tone at the in-band frequency received by the mixers 130A and 130B, the digital tuning engine 150 gets a first I/Q gain imbalance and a first I/Q phase imbalance at the in-band frequency. Then, the RF transmitter transmits a second tone at a near-cut-off frequency or at a certain frequency to the mixers 130A and 130B to get the gain and phase imbalance near cut-off frequency or at a certain frequency, which includes mixer and filter mismatches. In response to the second tone received by the mixers 130A and 130B, the digital tuning engine 150 gets a second I/Q gain imbalance and a second I/Q phase imbalance at the near-cut-off frequency or at the certain frequency. The digital tuning engine 150 tunes settings of the capacitor banks of the I-path analog filter 140A and/or the Q-path analog filter 140B based on a first difference D1 between the first I/Q gain imbalance and the second I/Q gain imbalance. The digital tuning engine 150 tunes settings of the capacitor banks of the I-path analog filter 140A and/or the Q-path analog filter 140B based on a second difference D2 between the first I/Q phase imbalance and the second I/Q phase imbalance. In more details, if a condition is met ($D1 \geq THRESHOLD\_g$ or $D1 \leq (-1*THRESHOLD\_g)$), then the digital tuning engine 150 tunes settings of the capacitor banks of the I-path analog filter 140A and/or the Q-path analog filter 140B. THRESHOLD_g is a threshold value. Alternatively, if another condition is met ($D2 \geq THRESHOLD\_p$ or $D2 \leq (-1*THRESHOLD\_p)$), then the digital tuning engine 150 tunes settings of the capacitor banks of the I-path analog filter 140A and/or the Q-path analog filter 140B. THRESHOLD_p is a threshold value. Alternatively, if both the two conditions are met, then the digital tuning engine 150 tunes settings of the capacitor banks of the I-path analog filter 140A and/or the Q-path analog filter 140B.

In another implementation to execute I/Q filter mismatch calibration, the RF transmitter transmits a plurality of tones to the mixers 130A and 130B. At least one of the tones is at the in-band frequency, called a third tone, to get the gain and phase imbalance at in-band frequency, which includes mixer and filter mismatches; and at least one of the tones is at the near-cut-off frequency or at the certain frequency, called the fourth tone, to get the gain and phase imbalance at the near-cut-off frequency or at the certain frequency, which includes mixer and filter mismatches. The digital tuning engine 150 gets a third I/Q gain imbalance and a third I/Q phase imbalance at the in-band frequency; and the digital tuning engine 150 gets a fourth I/Q gain imbalance and a fourth I/Q phase imbalance at the near-cut-off frequency or at the certain frequency. The digital tuning engine 150 tunes settings of the capacitor banks of the I-path analog filter 140a and/or the Q-path analog filter 140B based on a third difference D3 between the third I/Q gain imbalance and the fourth I/Q gain imbalance. The digital tuning engine 150 tunes settings of the capacitor banks of the I-path analog filter 140A and/or the Q-path analog filter 140B based on a fourth difference D4 between the third I/Q phase imbalance and the fourth I/Q phase imbalance. In more details, if a condition is met ($D3 \geq THRESHOLD\_g$ or $D3 \leq (-1*THRESHOLD\_g)$), then the digital tuning engine 150 tunes settings of the capacitor banks of the I-path analog filter 140A and/or the Q-path analog filter 140B. Alternatively, if another condition is met ($D4 \geq THRESHOLD\_p$ or $D4 \leq (-1*THRESHOLD\_p)$), then the digital tuning engine 150 tunes settings of the capacitor banks of the I-path analog filter 140A and/or the Q-path analog filter 140B. Alternatively, if both the two conditions are met, then the digital tuning engine 150 tunes settings of the capacitor banks of the I-path analog filter 140A and/or the Q-path analog filter 140B.

In still another implementation to execute I/Q filter mismatch calibration, the RF transmitter transmits a fifth tone at the in-band frequency directly to the I-path analog filter 140A and Q-path analog filter 140B to get the gain and phase imbalance at in-band frequency, which includes filter mismatches. Further, the RF transmitter transmits a sixth tone at the near-cut-off frequency or at the certain frequency directly to the I-path analog filter 140A and Q-path analog filter 140B to get the gain and phase imbalance at in-band frequency, which includes filter mismatches. In this implementation, because the tones are directly transmitted to the I-path analog filter 140A and Q-path analog filter 140B (i.e. the tone does not pass through the mixers 130A and 130B), the gain and phase imbalance does not include mixer mismatches. In response to the fifth tone directly received by the I-path analog filter 140A and the Q-path analog filter 140B, the digital tuning engine 150 gets a fifth I/Q gain imbalance and a fifth I/Q phase imbalance at the in-band frequency. Further, in response to the sixth tone directly received by the I-path analog filter 140A and the Q-path analog filter 140B, the digital tuning engine 150 gets a sixth I/Q gain imbalance and a sixth I/Q phase imbalance at the near-cut-off frequency or at the certain frequency. The digital tuning engine 150 tunes settings of the capacitor banks of the I-path analog filter 140A and/or the Q-path analog filter 140B based on a fifth difference D5 between the fifth I/Q gain imbalance and the sixth I/Q gain imbalance. The digital tuning engine 150 tunes settings of the capacitor banks of the I-path analog filter 140A and/or the Q-path analog filter 140B based on a sixth difference D6 between the fifth I/Q phase imbalance and the sixth I/Q phase imbalance. In more details, if a condition is met (D5≥THRESHOLD_g or D5≤(-1*THRESHOLD_g)), then the digital tuning engine 150 tunes settings of the capacitor banks of the I-path analog filter 140A and/or the Q-path analog filter 140B. Alternatively, if another condition is met (D6≥THRESHOLD_p or D6≤(-1*THRESHOLD_p)), then the digital tuning engine 150 tunes settings of the capacitor banks of the I-path analog filter 140A and/or the Q-path analog filter 140B. Alternatively, if both the two conditions are met, then the digital tuning engine 150 tunes settings of the capacitor banks of the I-path analog filter 140A and/or the Q-path analog filter 140B.

In yet another implementation to execute I/Q filter mismatch calibration, the RF transmitter transmits a plurality of tones directly to the I-path analog filter 140A and Q-path analog filter 140B (i.e. the tone does not pass through the mixers 130A and 130B). At least one of tones is at the in-band frequency, called the seventh tone, to get the gain and phase imbalance at in-band frequency, which includes filter mismatches; and at least one of the ones is at the near-cut-off frequency or at the certain frequency directly, called the eighth tone, to get the gain and phase imbalance at the near-cut-off frequency or at the certain frequency, which includes filter mismatches. In response to the seventh tone directly received by the I-path analog filter 140A and the Q-path analog filter 140B, the digital tuning engine 150 gets a seventh I/Q gain imbalance and a seventh I/Q phase imbalance at the in-band frequency. In response to the eighth tone directly received by the I-path analog filter 140A and the Q-path analog filter 140B, the digital tuning engine 150 gets an eighth I/Q gain imbalance and an eighth I/Q phase imbalance at the near-cut-off frequency or at the certain frequency. The digital tuning engine 150 tunes settings of the capacitor banks of the I-path analog filter 140A and/or the Q-path analog filter 140B based on a seventh difference D7 between the seventh I/Q gain imbalance and the eighth I/Q gain imbalance. The digital tuning engine 150 tunes settings of the capacitor banks of the I-path analog filter 140A and/or the Q-path analog filter 140B based on an eighth difference D8 between the seventh I/Q phase imbalance and the eighth I/Q phase imbalance. In more details, if a condition is met (D7≥THRESHOLD_g or D7≤(-1*THRESHOLD_g)), then the digital tuning engine 150 tunes settings of the capacitor banks of the I-path analog filter 140A and/or the Q-path analog filter 140B. Alternatively, if another condition is met (D8≥THRESHOLD_p or D8≤(-1*THRESHOLD_p)), then the digital tuning engine 150 tunes settings of the capacitor banks of the I-path analog filter 140A and/or the Q-path analog filter 140B. Alternatively, if both the two conditions are met, then the digital tuning engine 150 tunes settings of the capacitor banks of the I-path analog filter 140A and/or the Q-path analog filter 140B.

Figure 4B:
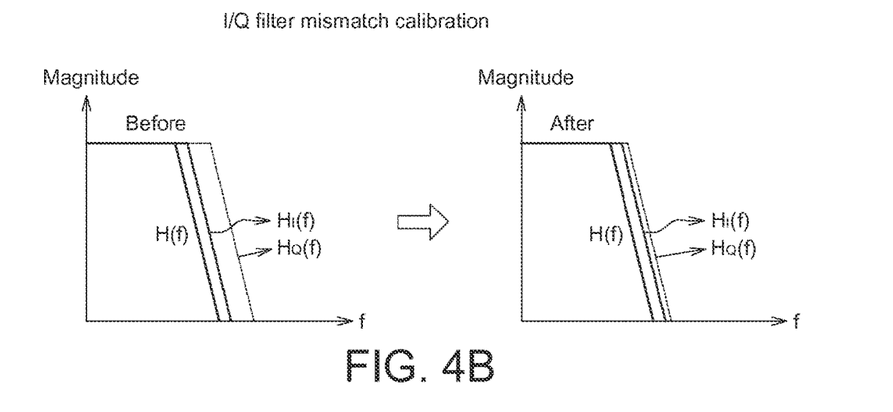
FIG. 4B shows a result of I/Q filter mismatch calibration in the embodiment of the application.

Now, please refer to FIG. 4B, which shows a result of I/Q filter mismatch calibration in the embodiment of the application. As shown in FIG. 4B, after I/Q filter mismatch calibration, the filter mismatch between the I-path response $H_I(f)$ and the Q-path response $H_Q(f)$ is smaller than before I/Q filter mismatch calibration.

Figure 4C:
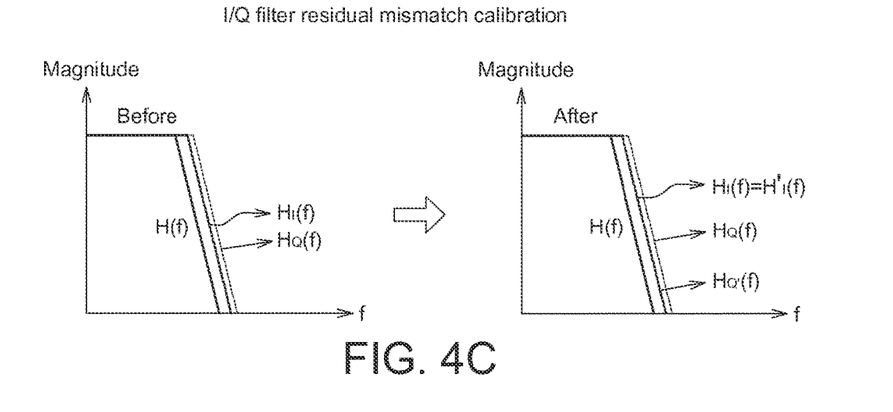
FIG. 4C shows a result of filter residual mismatch calibration in the embodiment of the application.

In step 330, the digital tuning engine 150 executes a filter residual mismatch calibration to more match the I-path response $H_I(f)$ with the Q-path response $H_Q(f)$. FIG. 4C shows a result of filter residual mismatch calibration in the embodiment of the application. As shown in FIG. 4C, after I/Q filter residual mismatch calibration, the filter mismatch between the I-path response $H_I(f)$ and the Q-path response $H_Q(f)$ is even smaller than before I/Q filter residual mismatch calibration. For example, after I/Q filter residual mismatch calibration, the calibrated I-path response $H_I'(f)$ from the digital compensation circuit 160 is the same as the I-path response $H_I(f)$ (i.e. $H_I'(f)=H_I(f)$) but the calibrated Q-path response $H_Q'(f)$ from the digital compensation circuit 160 is the same as the calibrated I-path response $H_I'(f)$ (i.e. $H_Q'(f)=H_I'(f)$).

In summary, in the embodiment of the application, in order to calibrate systematic mismatch variations, detection of frequency-dependent I/Q imbalance is provided, in order to reduce I/Q filter mismatch due to gradient effects, which improves I/Q filter imbalances. Frequency-dependent I/Q imbalance measurement is to detect I/Q filter mismatch. Measurement of I/Q imbalance on at least two frequencies (for example, at the in-band frequency, or near cut-off frequency or at the desired frequency) is to detect I/Q filter mismatch. Based on results of mismatch detection, the embodiment finely tunes capacitor bank setting of I-path analog filter and/or Q-path analog filter, to reduce systematic mismatch variations. For the capacitor bank tuning, the same setting is applied to each stage of I-path analog filter and/or Q-path analog filter when the 1st-order gradient effect dominates the systematic mismatch to reduce calibration complexity. For the capacitor bank tuning, stage-by-stage calibration is applied for the general cases, where higher-order gradient effects exists in addition to 1st-order gradient effect.

Still further, in the embodiment, in order to calibrate random mismatch variation, detection of frequency-dependent I/Q imbalance is provided in order to reduce I/Q filter mismatch, which improves I/Q filter imbalances. Frequency-dependent I/Q imbalance measurement is to detect I/Q filter mismatch. Measurement of I/Q imbalance on at least two frequencies is to detect I/Q filter mismatch. Based on results of mismatch detection, the embodiment finely tunes capacitor bank setting of I-path analog filter and/or Q-path analog filter to reduce random mismatch variations. For the capacitor bank tuning, stage-by-stage calibration is applied to reduce the random mismatch variations.

Still further, in the embodiment, a complete digitally-assisted calibration flow for filter variations, which include process variations, systematic mismatch variations, and random mismatch variations, is provided to adjust cut-off frequency of I-path analog filter and Q-path analog filter to the desired frequency and to align I/Q filter systematic and random mismatches in order to improve filter attenuation and I/Q imbalance. RC calibration is to deal with process variations. Frequency-dependent I/Q imbalance detection is to deal with systematic variations and random mismatch variations. Digital frequency-dependent I/Q calibration is to deal with residual systematic variations and random mismatch variations.

Effects and advantages of the embodiment are as follows.

The I-path analog filter 140A and the Q-path analog filter 140B are in analog domain while the digital tuning engine 150 and the digital compensation circuit 160 are in digital domain. In the embodiment, the systematic mismatch variation and random mismatch variation are calibrated in the analog domain so that the tap number of digital compensation filter will be reduced significantly. Thus, the power consumption in the digital domain is reduced without adding power consumption in the analog domain.

Also, the embodiment is suitable in high-performance receiver. As discussed above, in the prior art, in order to limit the random mismatch variation, the circuit component area should be enlarged or otherwise it needs digital compensation filter for I/Q imbalance. However, in the embodiment, the random mismatch variation and systematic mismatch variation are calibrated to compensate filter mismatch in the analog domain through the capacitor bank tuning. Thus, there is no need for digital compensation filter if I/Q imbalance of the residual systematic variation and the random mismatch variation is small enough.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A radio frequency (RF) receiver, comprising:
   a digital tuning engine;
   an I (in-phase)-path analog filter, coupled to and tuned by the digital tuning engine; and
   a Q (quadrature-phase)-path analog filter, coupled to and tuned by the digital tuning engine;
   wherein in response to a first tone at an in-band frequency, the digital tuning engine gets a first I/Q imbalance difference; in response to a second tone at a near-cut-off frequency or at a certain frequency, the digital tuning engine gets a second I/Q imbalance difference; the digital tuning engine tunes settings of the I-path analog filter and/or the Q-path analog filter based on the first I/Q imbalance difference and the second I/Q imbalance difference.

2. The RF receiver according to claim 1, wherein the I-path analog filter includes a circuit with filtering function.

3. The RF receiver according to claim 1, wherein the Q-path analog filter includes a circuit with filtering function.

4. The RF receiver according to claim 1, wherein:
   in executing RC time constant calibration, the digital tuning engine gets a capacitor bank setting by performing RC time constant calibration on one of capacitors of either the I-path analog filter or the Q-path analog filter; and
   the digital tuning engine tunes all of the capacitors of both the I-path analog filter and the Q-path analog filter based on the capacitor bank setting.

5. The RF receiver according to claim 1, wherein:
   in executing RC time constant calibration, the digital tuning engine gets an I-path capacitor bank setting by performing RC time constant calibration on one of capacitors of the I-path analog filter; and
   the digital tuning engine tunes all of the capacitors of the I-path analog filter based on the I-path capacitor bank setting.

6. The RF receiver according to claim 1, wherein:
   in executing RC time constant calibration, the digital tuning engine gets a Q-path capacitor bank setting by performing RC time constant calibration on one of capacitors of the Q-path analog filter; and
   the digital tuning engine tunes all of the capacitors of the Q-path analog filter based on the Q-path capacitor bank setting.

7. The RF receiver according to claim 1, wherein:
   in executing filter mismatch calibration, the digital tuning engine gets I/Q gain and phase imbalances at two distinct frequencies to mach the I-path analog filter and the Q-path analog filter.

8. The RF receiver according to claim 7, further comprising two mixers respectively in front of and respectively coupled to the I-path analog filter and the Q-path analog filter;
   wherein:
   in response to the first tone at the in-band frequency in front of the mixers, the digital tuning engine gets a first I/Q gain imbalance and a first I/Q phase imbalance at the in-band frequency; in response to the second tone at the near-cut-off frequency or at the certain frequency in front of the mixers, the digital tuning engine gets a second I/Q gain imbalance and a second I/Q phase imbalance at the near-cut-off frequency or at the certain frequency; the digital tuning engine tunes settings of the I-path analog filter and/or the Q-path analog filter based on a first difference between the first I/Q gain imbalance and the second I/Q gain imbalance; and the digital tuning engine tunes settings of the I-path analog filter and/or the Q-path analog filter based on a second difference between the first I/Q phase imbalance and the second I/Q phase imbalance; or
   in response to at least one third tone at the in-band frequency in front of the mixers, the digital tuning engine gets a third I/Q gain imbalance and a third I/Q phase imbalance at the in-band frequency; in response to at least one fourth tone at the near-cut-off frequency or at the certain frequency in front of the mixers, the digital tuning engine gets a fourth I/Q gain imbalance and a fourth I/Q phase imbalance at the near-cut-off frequency or at the certain frequency; the digital tuning engine tunes settings of the I-path analog filter and/or the Q-path analog filter based on a third difference between the third I/Q gain imbalance and the fourth I/Q gain imbalance; and the digital tuning engine tunes settings of the I-path analog filter and/or the Q-path analog filter based on a fourth difference between the third I/Q phase imbalance and the fourth I/Q phase imbalance.

9. The RF receiver according to claim 7, wherein:
   in response to a fifth tone at the in-band frequency in front of the I-path analog filter and the Q-path analog filter, the digital tuning engine gets a fifth I/Q gain imbalance and a fifth I/Q phase imbalance at the in-band frequency;
   in response to a sixth tone at the near-cut-off frequency or at the certain frequency in front of the I-path analog filter and the Q-path analog filter, the digital tuning engine gets a sixth I/Q gain imbalance and a sixth I/Q phase imbalance at the near-cut-off frequency or at the certain frequency;

the digital tuning engine tunes settings of the I-path analog filter and/or the Q-path analog filter based on a fifth difference between the fifth I/Q gain imbalance and the sixth I/Q gain imbalance; and the digital tuning engine tunes settings of the I-path analog filter and/or the Q-path analog filter based on a sixth difference between the fifth I/Q phase imbalance and the sixth I/Q phase imbalance.

10. The RF receiver according to claim 7, wherein:

in response to at least one seventh tone at the in-band frequency in front of the I-path analog filter and the Q-path analog filter, the digital tuning engine gets a seventh I/Q gain imbalance and a seventh I/Q phase imbalance at the in-band frequency;

in response to at least one eighth tone at the near-cut-off frequency or at the certain frequency in front of the I-path analog filter and the Q-path analog filter, the digital tuning engine gets an eighth I/Q gain imbalance and an eighth I/Q phase imbalance at the near-cut-off frequency or at the certain frequency;

the digital tuning engine tunes settings of the I-path analog filter and/or the Q-path analog filter based on a seventh difference between the seventh I/Q gain imbalance and the eighth I/Q gain imbalance; and the digital tuning engine tunes settings of the I-path analog filter and/or the Q-path analog filter based on an eighth difference between the seventh I/Q phase imbalance and the eighth I/Q phase imbalance.

11. A digitally-assisted calibration method applicable to a radio frequency (RF) receiver including an I (in-phase)-path analog filter, a Q (quadrature-phase)-path analog filter and a digital tuning engine, the method comprising:

obtaining an I/Q imbalance difference, and in response to a first tone at an in-band frequency, getting a first I/Q imbalance difference; in response to a second tone at a near-cut-off frequency or at a certain frequency, getting a second I/Q imbalance difference; and tuning settings of the I-path analog filter and/or the Q-path analog filter based on the first I/Q imbalance difference and the second I/Q imbalance difference.

12. The digitally-assisted calibration method according to claim 11, wherein the I-path analog filter includes a circuit with filtering function.

13. The digitally-assisted calibration method according to claim 11, wherein the Q-path analog filter includes a circuit with filtering function.

14. The digitally-assisted calibration method according to claim 11, further comprising:

in executing RC time constant calibration, getting a capacitor bank setting by using one of capacitors of either the I-path analog filter or the Q-path analog filter; and tuning all of the capacitors of both the I-path analog filter and the Q-path analog filter based on the capacitor bank setting.

15. The digitally-assisted calibration method according to claim 11, further comprising:

in executing RC time constant calibration, getting an I-path capacitor bank setting by using one of capacitors of the I-path analog filter; and tuning all of the capacitors of the I-path analog filter based on the I-path capacitor bank setting.

16. The digitally-assisted calibration method according to claim 11, further comprising:

in executing RC time constant calibration, getting a Q-path capacitor bank setting by using one of the capacitors of the Q-path analog filter; and the digital tuning engine tunes all of the capacitors of the Q-path analog filter based on the Q-path capacitor bank setting.

17. The digitally-assisted calibration method according to claim 11, further comprising:

in executing filter mismatch calibration, getting I/Q gain and phase imbalances at two distinct frequencies to match the I-path analog filter and the Q-path analog filter.

18. The digitally-assisted calibration method according to claim 17, wherein:

the RF receiver further comprises two mixers respectively in front of and respectively coupled to the I-path analog filter and the Q-path analog filter;

the step of executing the filter mismatch calibration includes:

in response to the first tone at the in-band frequency in front of the mixers, getting a first I/Q gain imbalance and a first I/Q phase imbalance at the in-band frequency; in response to the second tone at the near-cut-off frequency or at the certain frequency in front of the mixers, getting a second I/Q gain imbalance and a second I/Q phase imbalance at the near-cut-off frequency or at the certain frequency; tuning settings of the I-path analog filter and/or the Q-path analog filter based on a first difference between the first I/Q gain imbalance and the second I/Q gain imbalance; and tuning settings of the I-path analog filter and/or the Q-path analog filter based on a second difference between the first I/Q phase imbalance and the second I/Q phase imbalance, or in response to at least one third tone at the in-band frequency in front of the mixers, getting a third I/Q gain imbalance and a third I/Q phase imbalance at the in-band frequency; in response to at least one fourth tone at the near-cut-off frequency or at the certain frequency in front of the mixers, getting a fourth I/Q gain imbalance and a fourth I/Q phase imbalance at the near-cut-off frequency or at the certain frequency; tuning settings of the I-path analog filter and/or the Q-path analog filter based on a third difference between the third I/Q gain imbalance and the fourth I/Q gain imbalance; and tuning settings of the I-path analog filter and/or the Q-path analog filter based on a fourth difference between the third I/Q phase imbalance and the fourth I/Q phase imbalance.

19. The digitally-assisted calibration method according to claim 17, wherein the step of executing the filter mismatch calibration includes:

in response to a fifth tone at the in-band frequency in front of the I-path analog filter and the Q-path analog filter, getting a fifth I/Q gain imbalance and a fifth I/Q phase imbalance at the in-band frequency;

in response to a sixth tone at the near-cut-off frequency or at the certain frequency in front of the I-path analog filter and the Q-path analog filter, getting a sixth I/Q gain imbalance and a sixth I/Q phase imbalance at the near-cut-off frequency or at the certain frequency;

tuning settings of the I-path analog filter and/or the Q-path analog filter based on a fifth difference between the fifth I/Q gain imbalance and the sixth I/Q gain imbalance; and tuning settings of the I-path analog filter and/or the Q-path analog filter based on a sixth difference between the fifth I/Q phase imbalance and the sixth I/Q phase imbalance.

20. The digitally-assisted calibration method according to claim 17, wherein the step of executing the filter mismatch calibration includes:
- in response to at least one seventh tone at the in-band frequency in front of the I-path analog filter and the Q-path analog filter, getting a seventh I/Q gain imbalance and a seventh I/Q phase imbalance at the in-band frequency;
- in response to at least one eighth tone at the near-cut-off frequency or at the certain frequency in front of the I-path analog filter and the Q-path analog filter, getting an eighth I/Q gain imbalance and an eighth I/Q phase imbalance at the near-cut-off frequency or at the certain frequency;
- tuning settings of the I-path analog filter and/or the Q-path analog filter based on a seventh difference between the seventh I/Q gain imbalance and the eighth I/Q gain imbalance; and
- tuning settings of the I-path analog filter and/or the Q-path analog filter based on an eighth difference between the seventh I/Q phase imbalance and the eighth I/Q phase imbalance.

* * * * *